T. J. FREDA.
EXCAVATOR.
APPLICATION FILED MAY 1, 1920.
1,380,790.
Patented June 7, 1921.
14 SHEETS—SHEET 4.
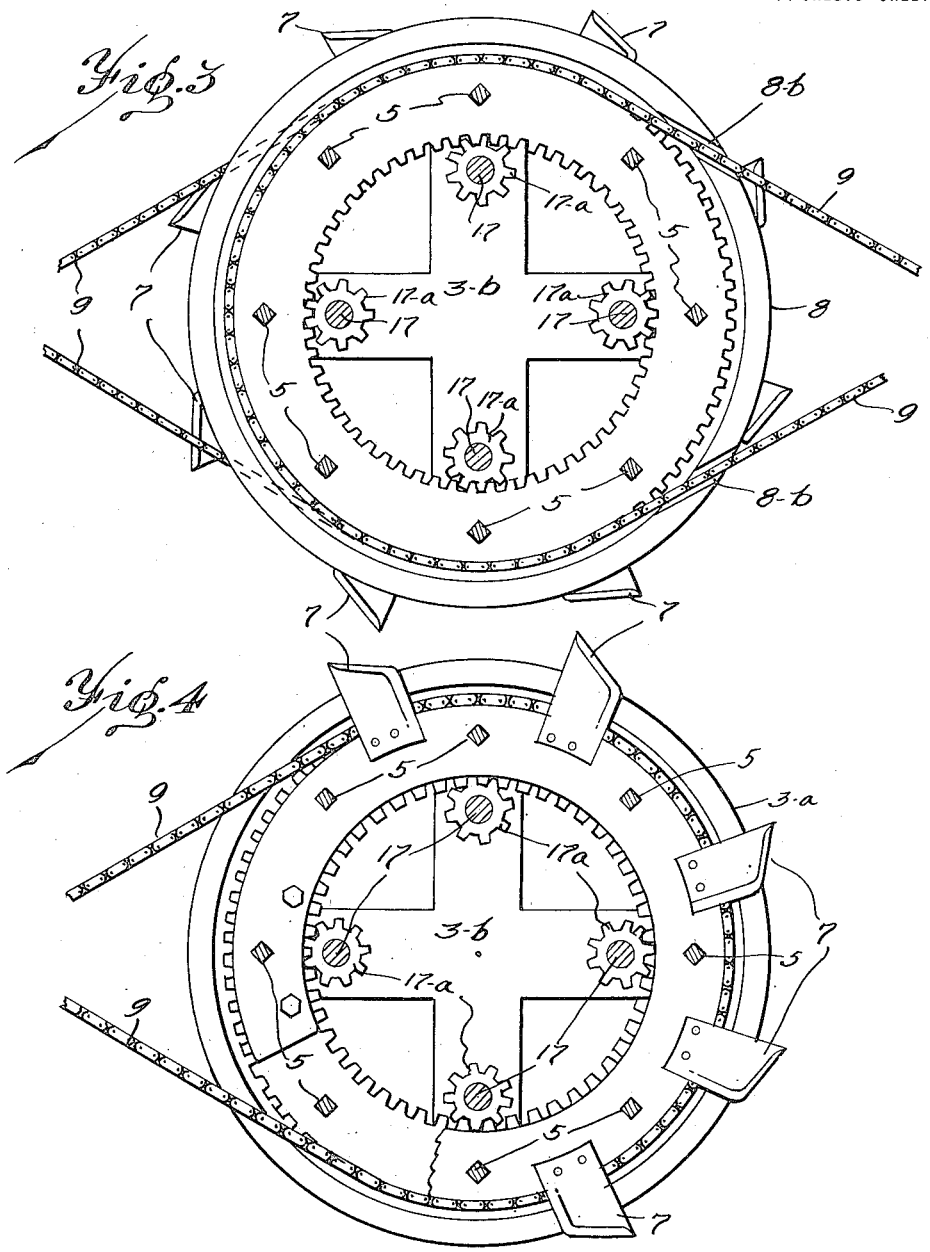
Inventor
THEOPHIL J. FREDA
By Raymond A. Parker
Attorney

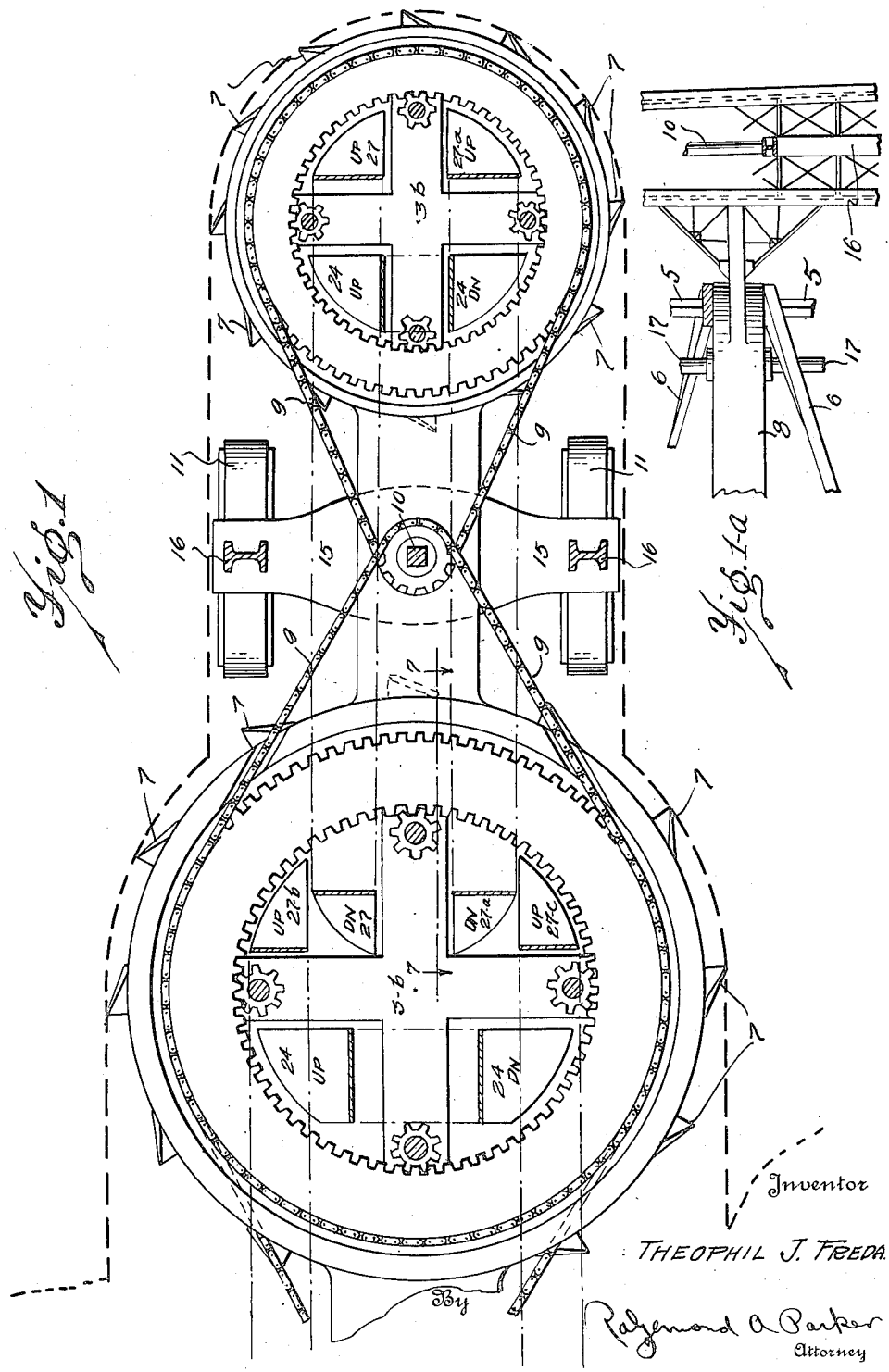

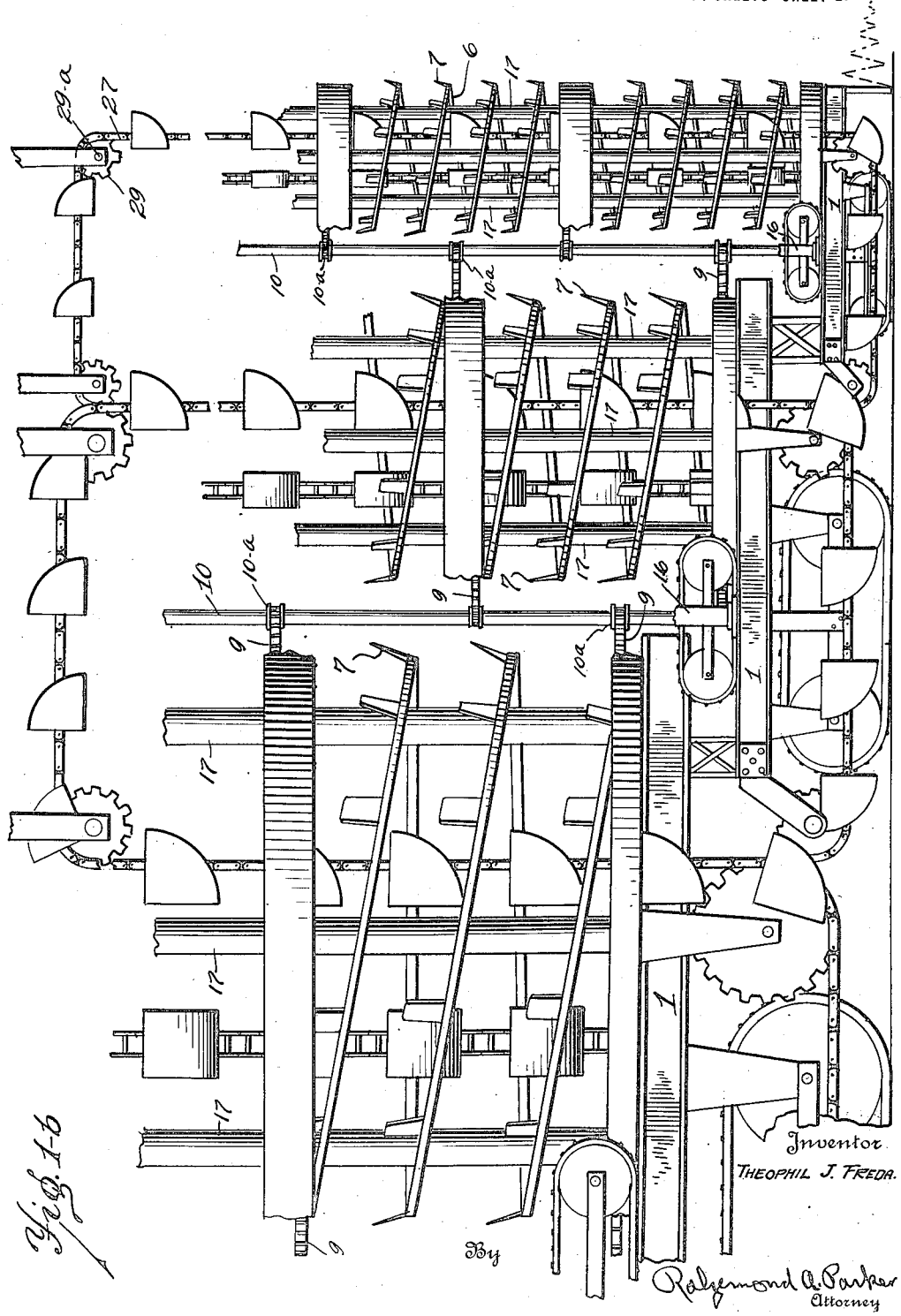

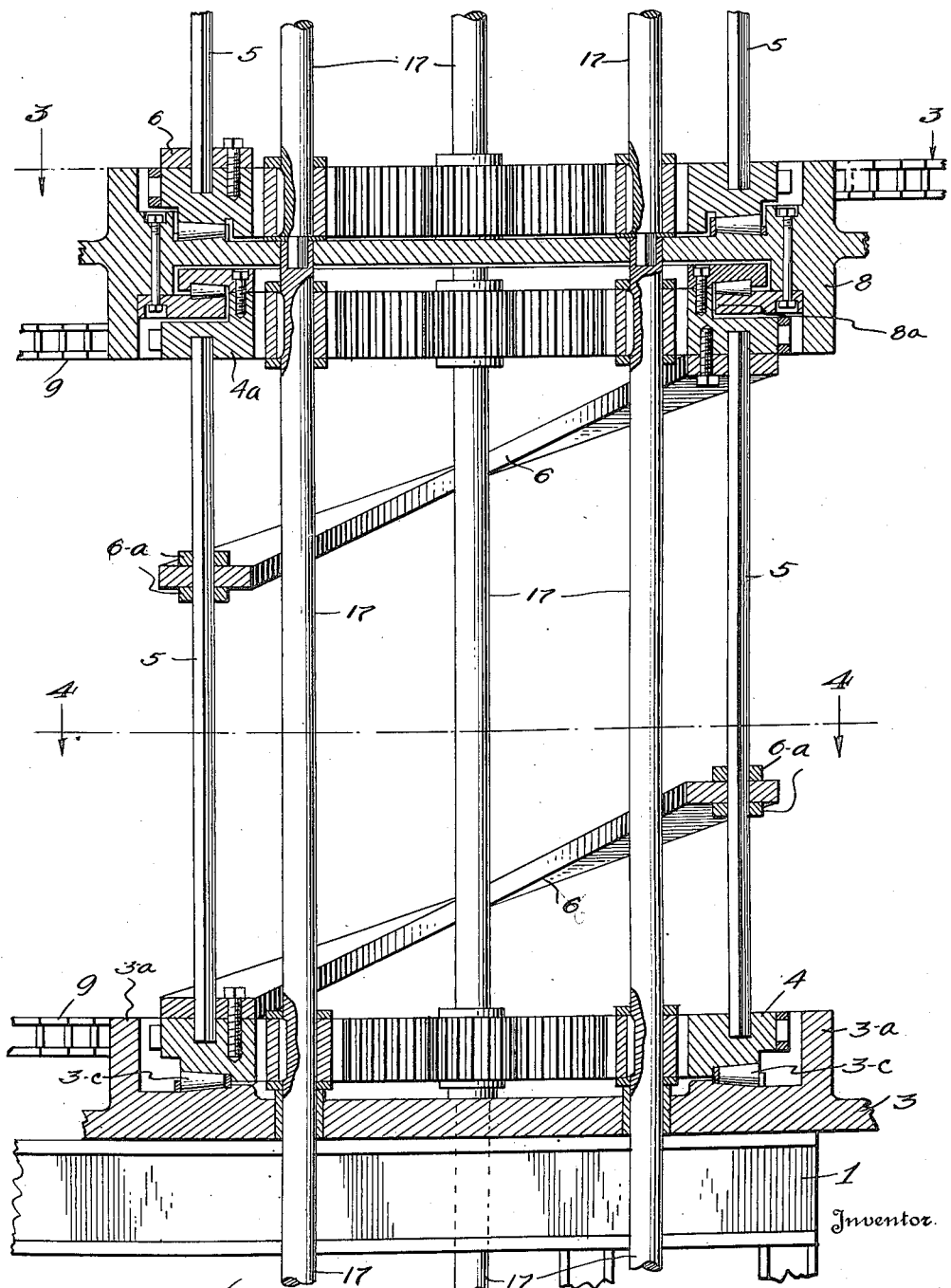

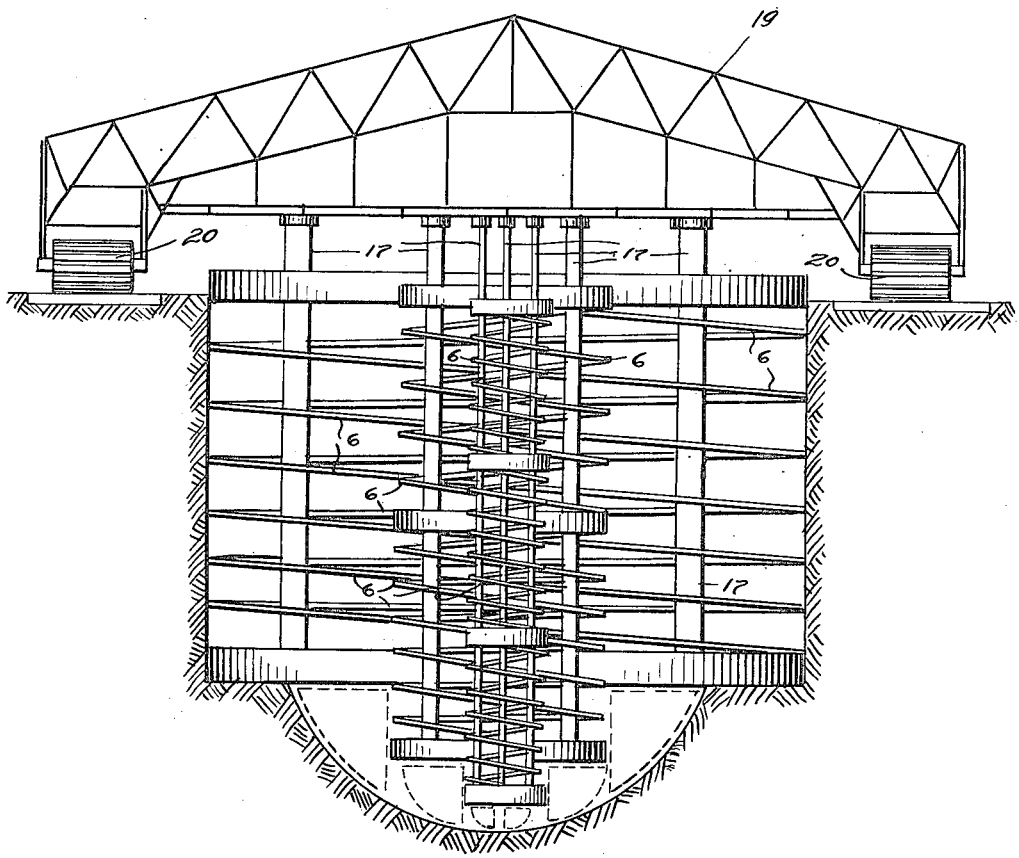

T. J. FREDA.
EXCAVATOR.
APPLICATION FILED MAY 1, 1920.
1,380,790.
Patented June 7, 1921.
14 SHEETS—SHEET 6.
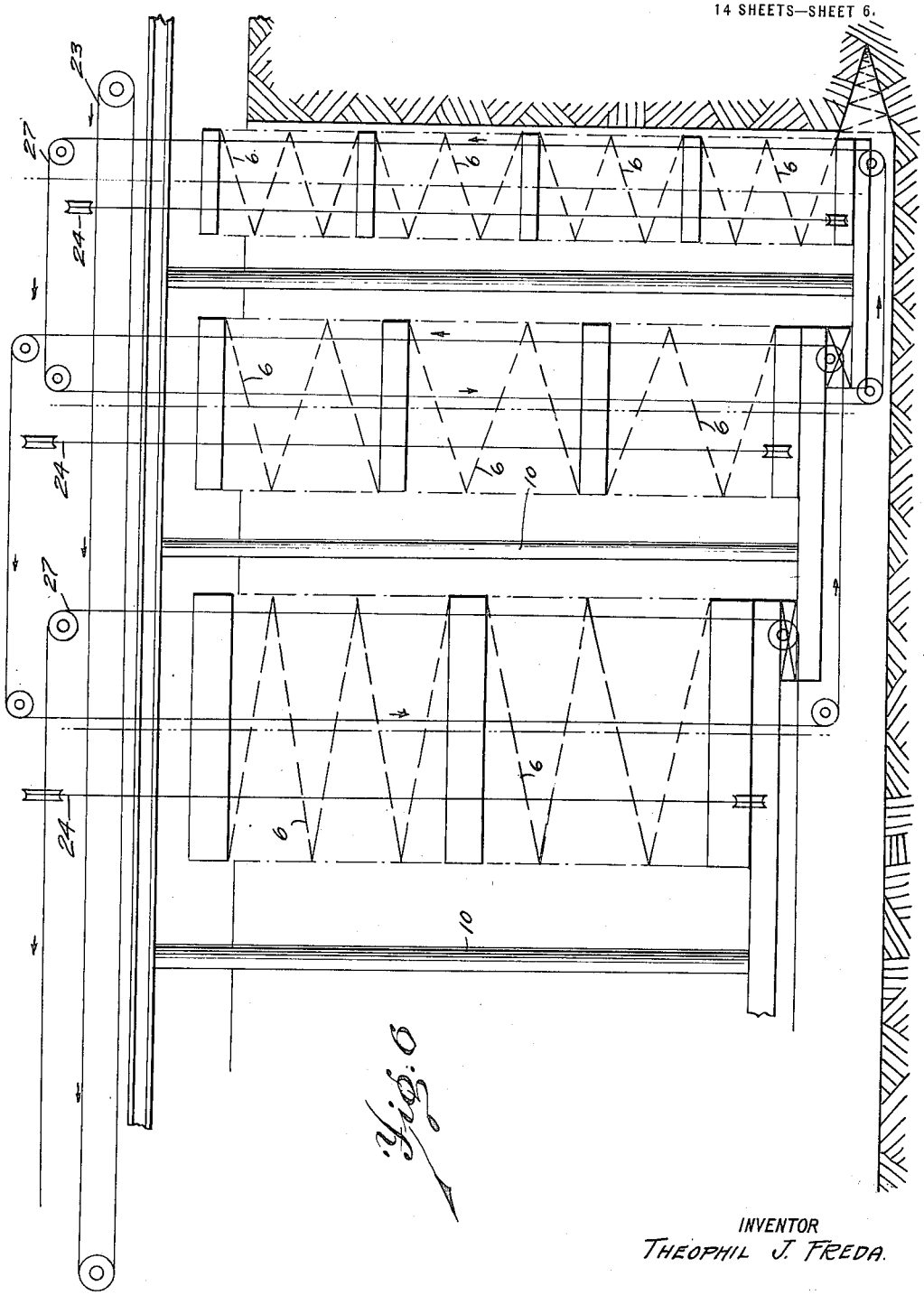
INVENTOR
THEOPHIL J. FREDA.
BY
Raymond A. Parker
ATTORNEY

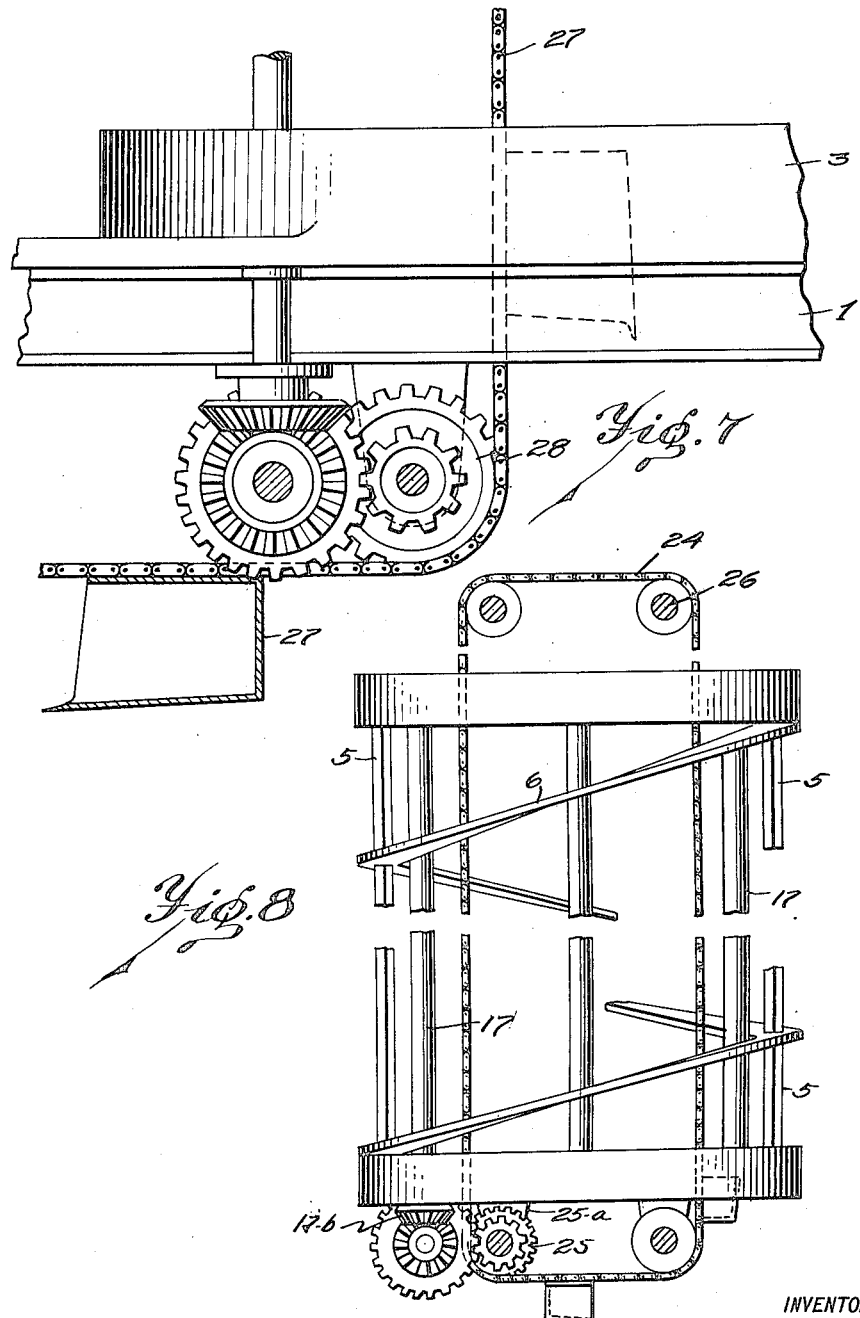

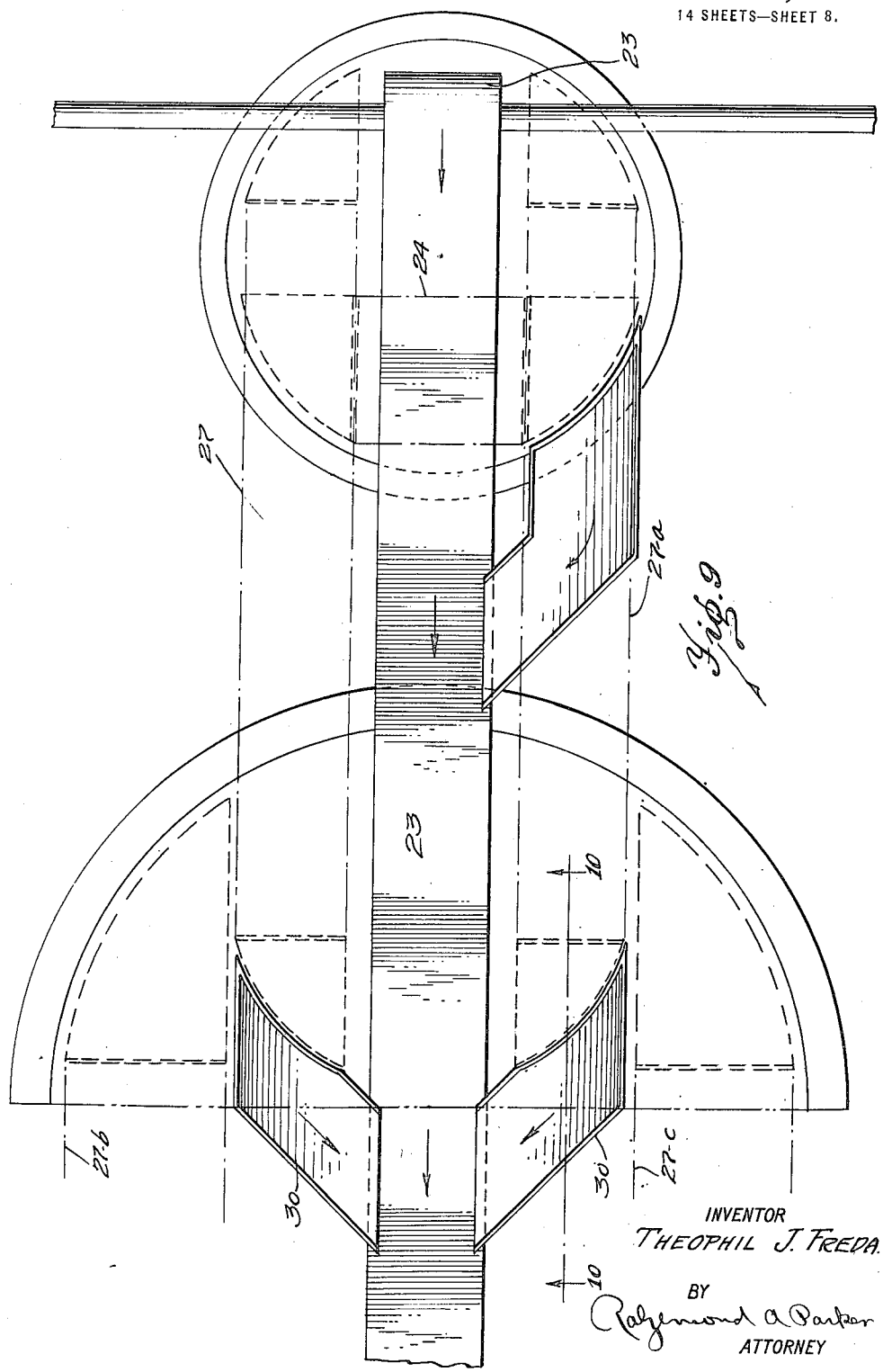

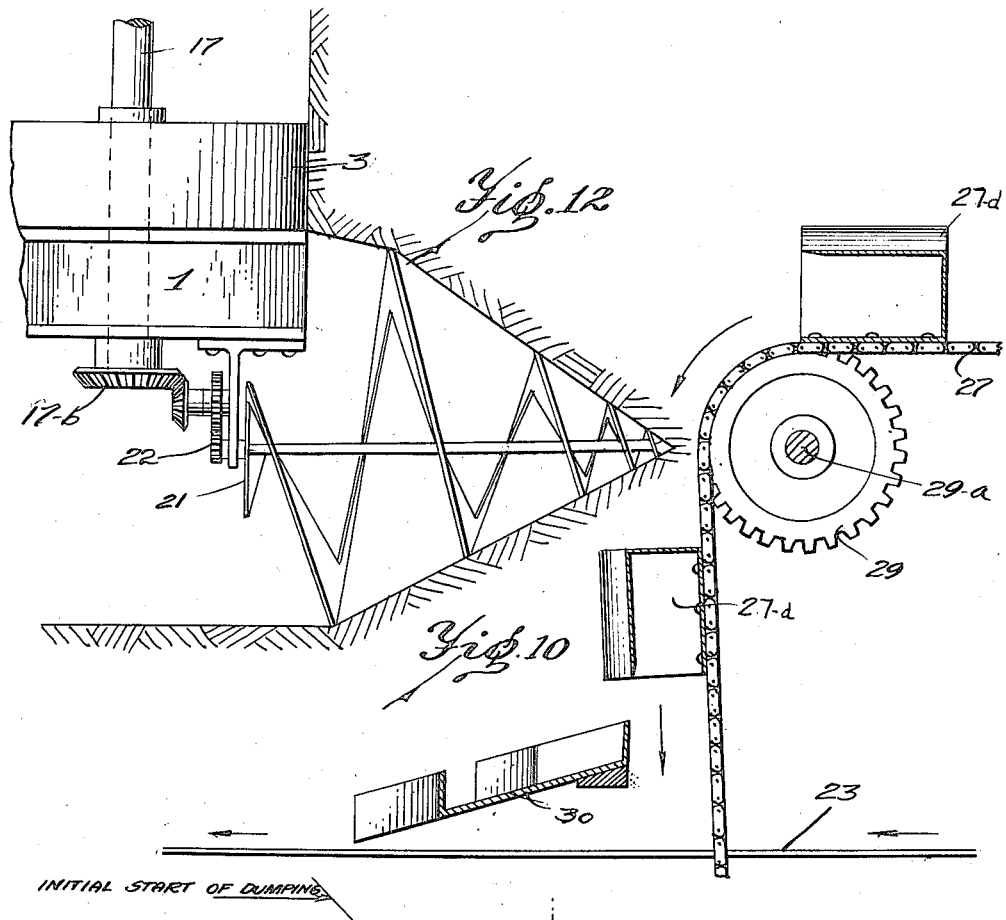

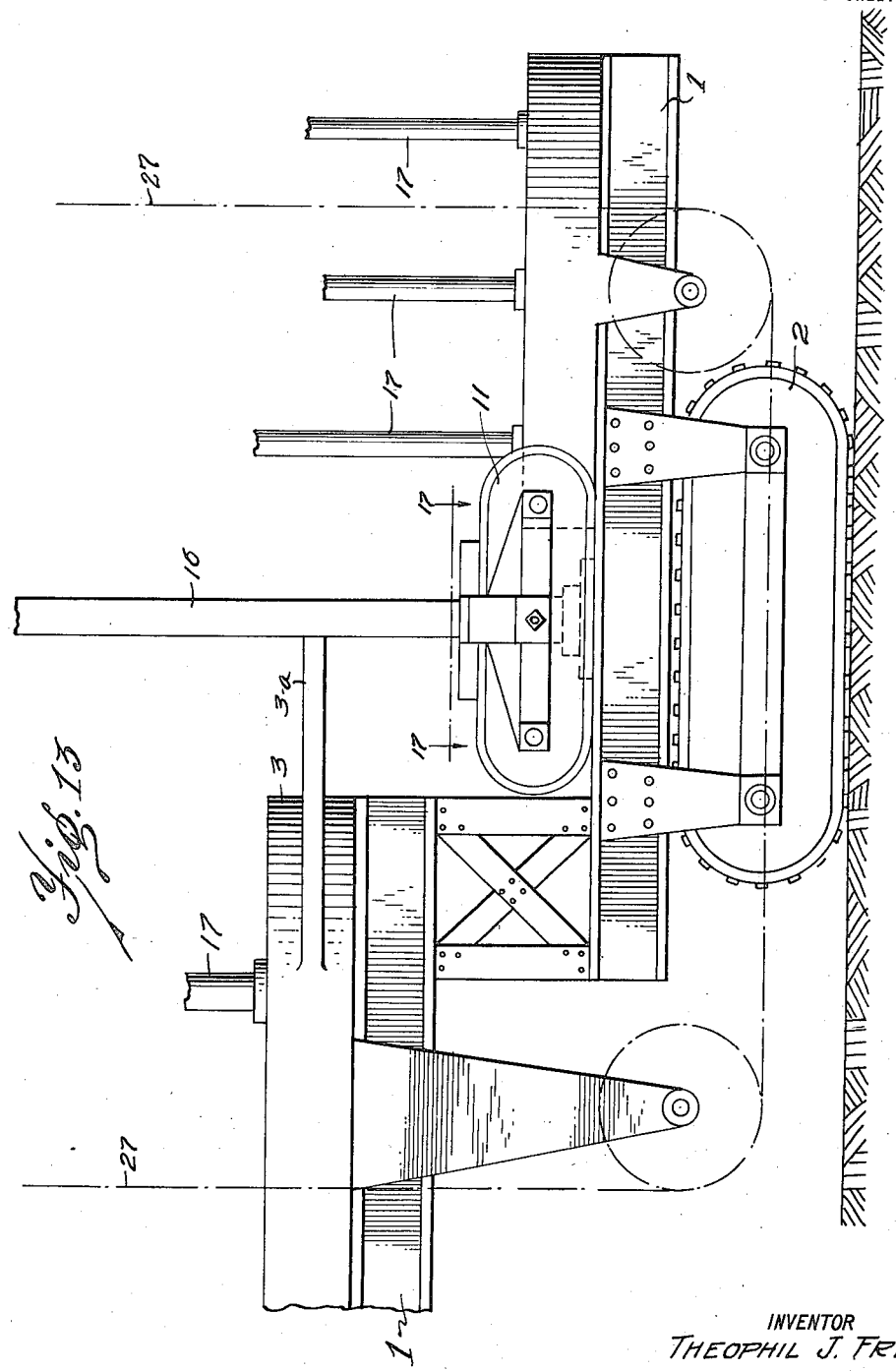

T. J. FREDA.
EXCAVATOR.
APPLICATION FILED MAY 1, 1920.
1,380,790.
Patented June 7, 1921.
14 SHEETS—SHEET 11.
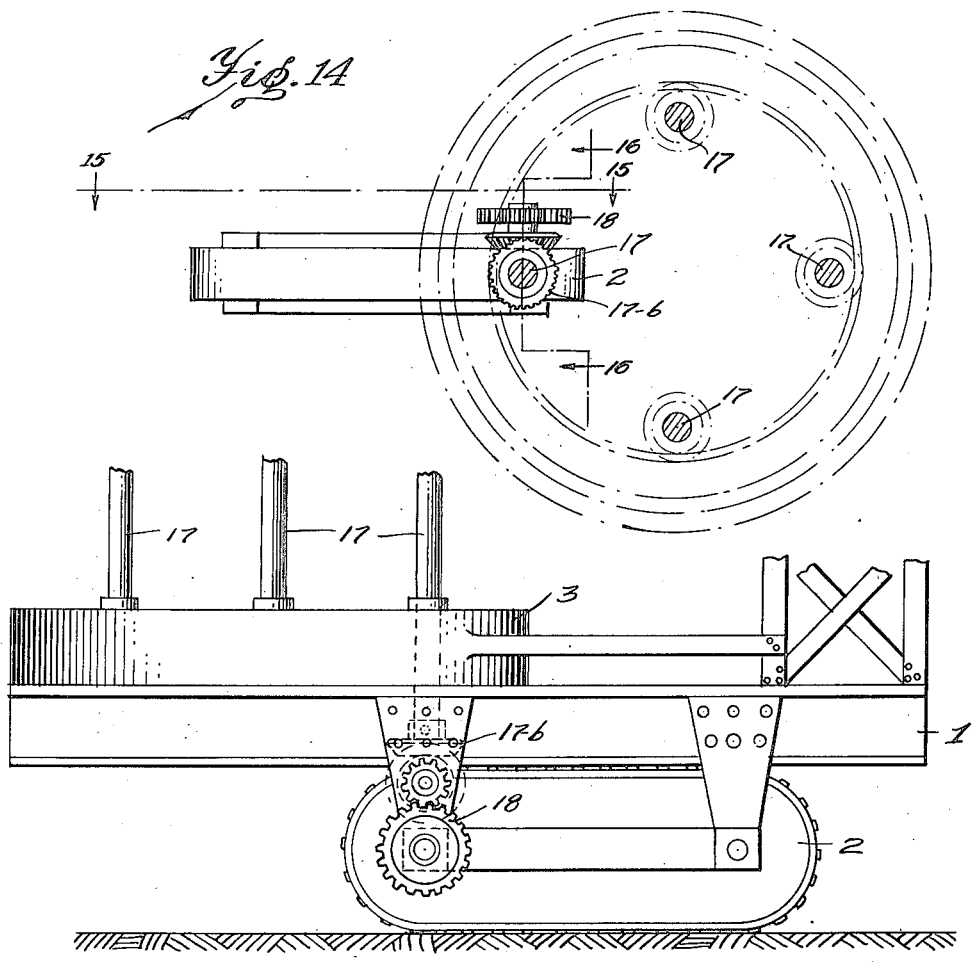
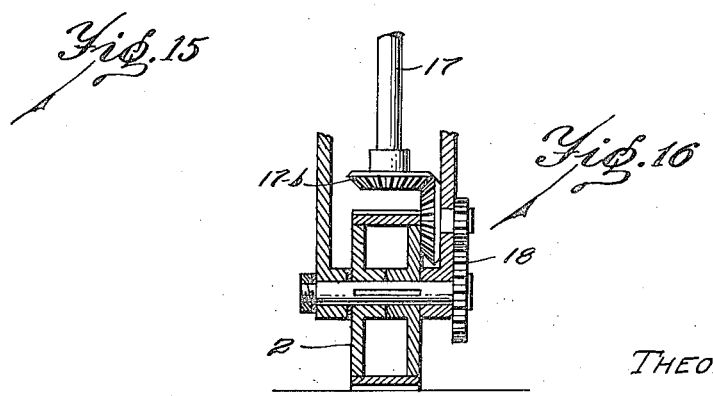
INVENTOR
THEOPHIL J. FREDA
BY
Raymond A. Parker
ATTORNEY

T. J. FREDA.
EXCAVATOR.
APPLICATION FILED MAY 1, 1920.

1,380,790.

Patented June 7, 1921.
14 SHEETS—SHEET 12.

INVENTOR
THEOPHIL J. FREDA

BY
Raymond A Parker
ATTORNEY

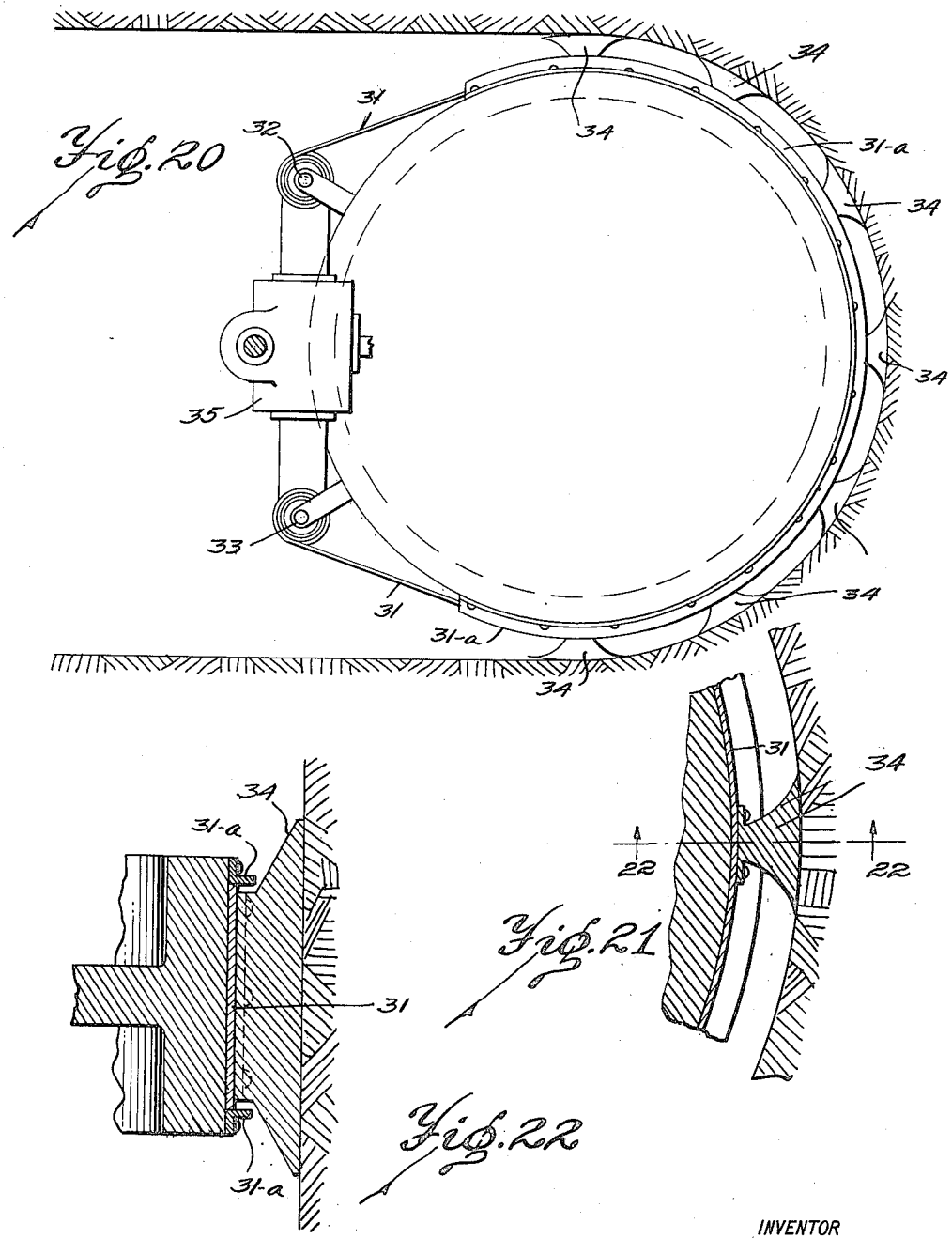

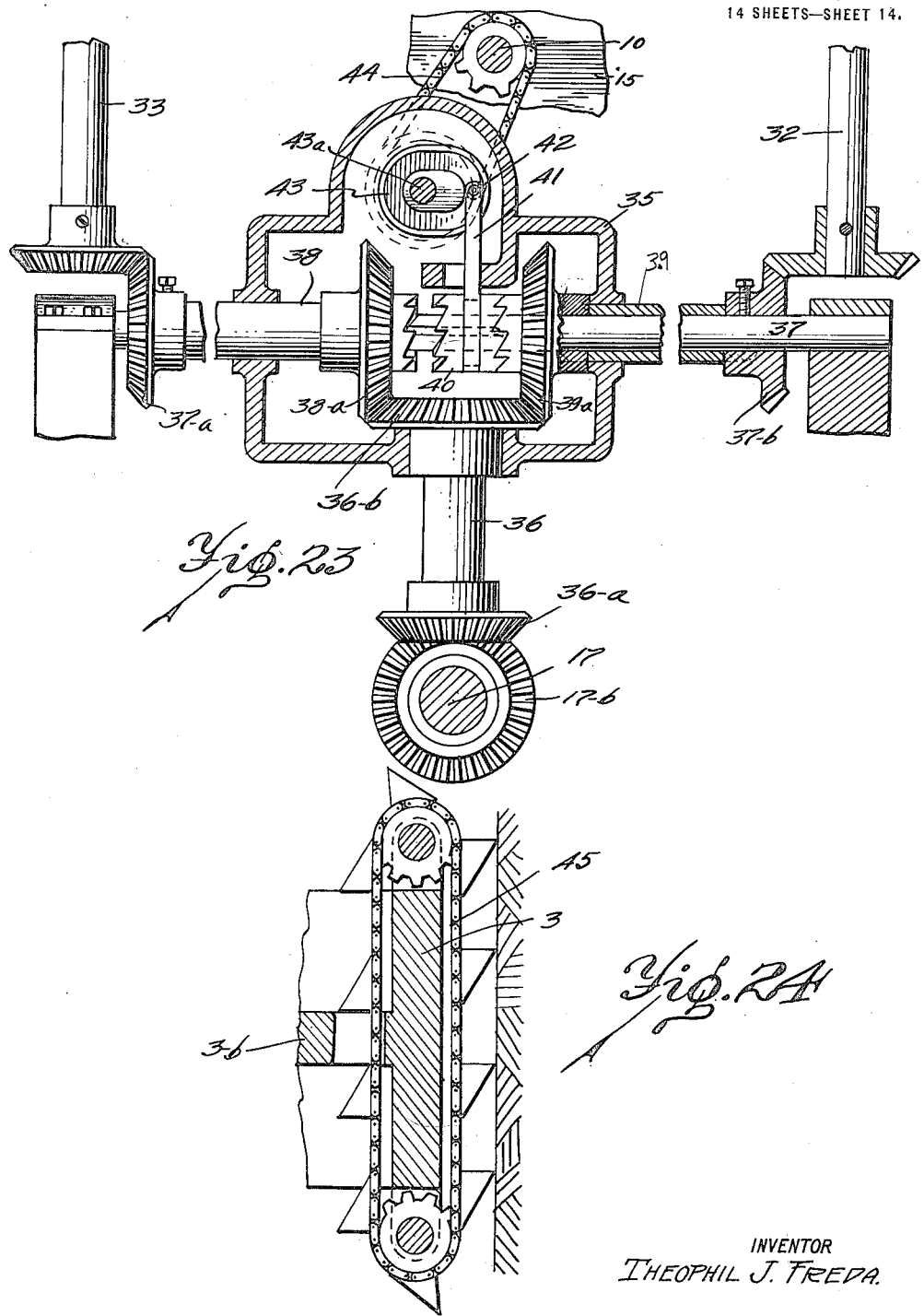

UNITED STATES PATENT OFFICE.

THEOPHIL J. FREDA, OF DETROIT, MICHIGAN.

EXCAVATOR.

1,380,790.   Specification of Letters Patent.   Patented June 7, 1921.

Application filed May 1, 1920. Serial No. 378,057.

*To all whom it may concern:*

Be it known that I, THEOPHIL J. FREDA, citizen of the United States, residing at Detroit, county of Wayne, State of Michigan, have invented a certain new and useful Improvement in Excavators, and declare the following to be a full, clear, and exact description of the same, such as will enable others skilled in the art to which it pertains to make and use the same, reference being had to the accompanying drawings, which form a part of this specification.

My invention relates to excavators, particularly ditch digging machinery. The object is to provide a machine composed of rotary cutting elements, connected together to form a train, being of successively increasing diameter from front to rear of such train and adapted to move forward through the earth as a unit excavating the ditch to size desired and provided with means for removing and carrying away such excavated earth.

In the drawings,—

Figure 1 is a plan view, partly in section showing two units.

Fig. 1ª is an elevation showing the means whereby one of the stationary drums is connected with the truss work carried by one of the driveshaft tractors.

Fig. 1ᵇ is an elevation, partly broken away, showing three vertical units.

Fig. 2 is a vertical section through one of the rotary cutting elements.

Fig. 3 is a cross-section on the line 3—3 of Fig. 2.

Fig. 4 is a cross-section on the line 4—4 of Fig. 2.

Fig. 5 is a front elevation showing the machine in position and showing the overhead supporting bridge.

Fig. 6 is a diagrammatic view of the elevator and conveyer systems.

Fig. 7 is a fragmentary elevation, partly in section, showing means for driving one of the conveyer belts.

Fig. 8 is an elevation, partly broken away, showing one of the lateral elevator chains and means for driving the same.

Fig. 9 is a plan, partly diagrammatic, showing the dumping chutes and main conveyer.

Fig. 10 is a fragmentary elevation showing relative position of elevator scoops and chute.

Fig. 11 is a diagram showing dumping of earth from scoops to chute.

Fig. 12 is an elevation showing screw boring element at forward end of machine.

Fig. 13 is a fragmentary elevation showing stepped platform base and supporting tractors.

Fig. 14 is a plan of one of the supporting tractor devices.

Fig. 15 is a side elevation taken on the line 15—15 of Fig. 14.

Fig. 16 is a section taken on the line 16—16 of Fig. 14.

Fig. 20 is a plan showing the belt which operates around the circumference of one of the stationary drums.

Fig. 21 is a horizontal section through a fragment thereof.

Fig. 22 is a vertical section on the line 22—22 of Fig. 21.

Fig. 23 is a vertical section through the reversible clutch which drives the belt reciprocally around the circumference of one of the stationary drums.

Fig. 24 is a modification showing different means for clearing a path for the stationary drum.

Figure 17:
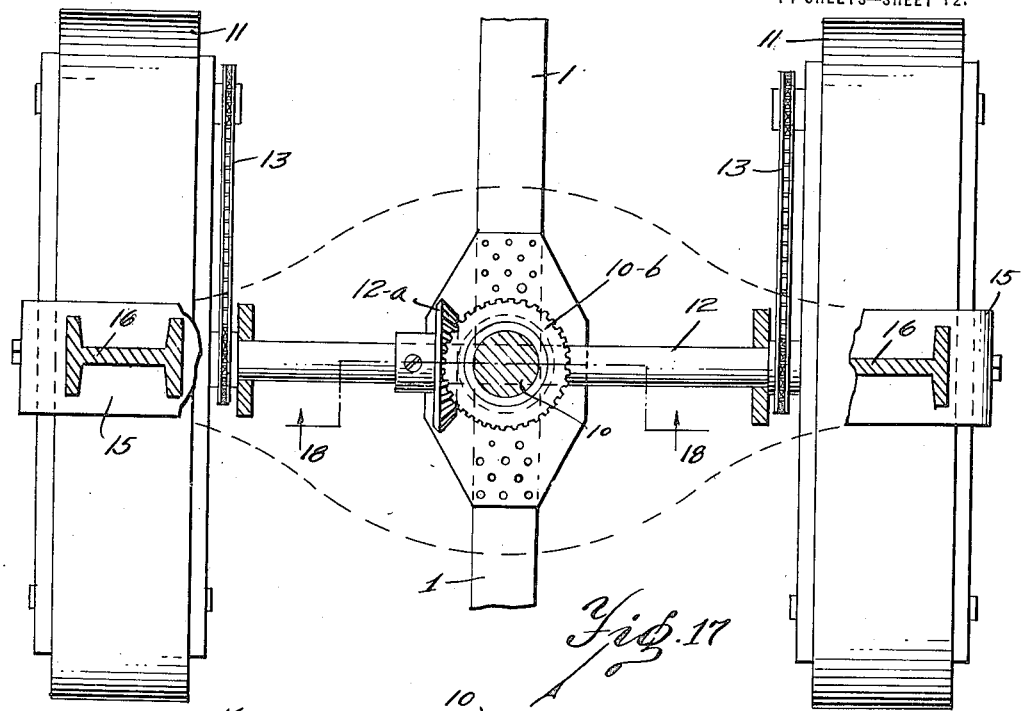
Fig. 17 is a plan of one of the tractors which supports a main drive shaft and the I-beams as supports for the drums.
Figure 18:
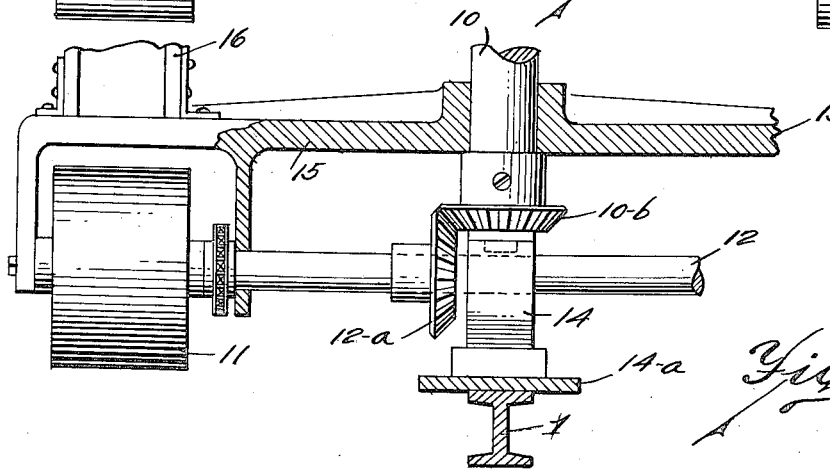
Fig. 18 is a section taken on the line 18—18 of Fig. 17.

In the drawings, 1 indicates centrally positioned base beams, here shown as I-beams, suitably supported on tractors 2, and carrying rotary cutting elements built up in vertical columns to desired height as shown in Fig. 1ᵇ. These central base beams, which support separate cutting units are connected together as shown in Fig. 1ᵇ and Fig. 13, so connected together, they form a stepped platform base adapted to support the rotary cutters.

Each central base beam 1, supports a stationary drum 3 formed with a flange 3ª and fashioned with an intervening web portion 3ᵇ. Disposed for rotation within this drum, suitably supported on roller bearings 3ᶜ is a rotary cutter, the operation of which is more clearly shown in Fig. 2.

This rotary cutter comprises a pair of rings indicated as 4 and 4ª, lower and upper rings respectively, spaced from one another and held in such relationship by means of upright standards 5. These standards 5 not only connect the rings together to form a cylindrical unit but support a spiral, circumferential platform ledge 6, as shown in Fig. 2 at 6$^a$.

Figure 19:
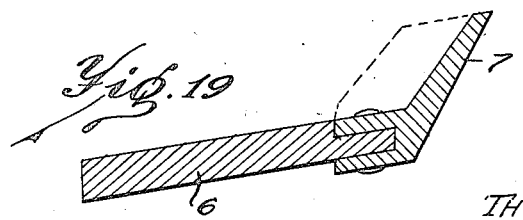
Fig. 19 is a section taken through one of the cutting knives and the spiral platform.

This spiral platform carries a series of cutting knives 7, as shown in Fig. 1$^b$. These cutting knives 7 are formed after the fashion of a scoop, as shown in Fig. 4, and project outwardly from the spiral platform so as to shave the earth away, causing the same to roll inwardly over the platform and down into the interior of the rotary cutting element, there to be picked up and carried away as hereinafter described. The outward flare of these knives and the slope of the platform are more clearly shown in Fig. 19.

The upper ring 4$^a$ is formed somewhat differently from the lower ring, as shown in Fig. 2, being formed with an overhanging flange spaced from the lower portion of said ring so as to provide a circumferential recess within which is received flange 8$^a$ carried by the upper stationary drum 8. Suitable roller bearings are provided to permit free rotation.

These rings 4 and 4$^a$ are exteriorly geared so as to be driven by chains 9, as shown in Fig. 1, which chains are driven from vertical drive shaft 10, which is provided with gears 10$^a$ so as to suitably drive said chains.

These vertical drive shafts 10 are supported by separate tractor elements 11, as shown in Fig. 17, and are positioned one each between succeeding rotary cutting units as shown in Fig. 1 and Fig. 1$^b$. Each shaft is provided at the lower end thereof with a bevel gear 10$^b$ adapted to mesh with a bevel gear 12$^a$ carried by axle 12 which connects opposite members of said pair of tractors 11. The tractors are directly driven by means of a chain drive 13 off the axle 12, as shown. To form a support for said shaft 10, and further form a supporting bearing for the tractor axle, a stub standard 14 is supported upon base-plate 14$^a$ which is carried by central I-beam 1 previously referred to. This stub standard is adapted to form a bearing support for said shaft 10 as shown in Fig. 17. A cross-member 15 supported from said axle and by said shaft 10 is shown carrying uprights 16. These uprights 16 are suitably braced from each other by lattice work, not shown, in the drawing but adapted so as to form a skeleton supporting framework from which struts may be carried to the stationary drums as shown in Fig. 1$^a$.

These main driving shafts 10 are driven from rear to front, as shown in Fig. 1 and Fig. 1$^b$. The initial power impulse is supplied from a power station or stations, not shown in the drawing, but in well-known fashion from any source of power supply. It will be seen that each shaft 10 will drive the rotary cutting element positioned ahead of it, and be in turn driven by the rotary cutting element positioned in its rear. It will be further observed that the tractor elements 11, which support the driving shafts 10 are on a level and of equal width with the diameter of the rotary cutting elements positioned forwardly thereof; each cutting element cuts to a certain width and depth and the tractor which supports the shaft 10 following in the rear will follow that cut path.

Chain 9 which drives the externally-geared ring 4$^a$ from shaft 10, as previously described, passes through passageways provided through the drum as shown in Fig. 3, indicated at 8$^b$.

These rings 4 and 4$^a$ are also internally geared to mesh with gears 17$^a$ provided on shafts 17. These shafts 17 are supported in the web portion of the drum with proper bearings not shown in the drawing, but in any suitable well known manner, and extend below the level of the drums and I-beams for purposes hereinafter described. One of these shafts 17 is shown in Figs. 14, 15 and 16 as extending downward below the I-beam 1. This shaft 17 is provided at its lower end with a bevel gear 17$^b$ which drives a train of gears, indicated in assembly as 18, which in turn drive the tractor 2, which supports said base I-beam after a well-known fashion. The other shafts 17 likewise extend downward to drive separate parts of the machinery hereinafter referred to.

It will be observed that drum 8, in addition to being partially supported by the rotary cutter itself is supported as shown in Fig. 1$^a$ by struts extending from the trestle work built up on the tractor 11, and indicated as to the uprights thereof as 16. Drum 8 is further adapted to serve as a lower supporting drum for a superimposed rotary cutter similar in all respects to the cutter just described and driven in the same manner. Shafts 17, are adapted, as shown, to connect end to end so as to drive as one shaft from top to bottom.

It will be seen that to form a further support for this digging machinery and its driving mechanism a bridge is provided, as shown in Fig. 5, indicated at 19, supported by tractors 20. These tractors should be driven from suitable sources of power supply in any convenient manner. Shafts 17 and shafts 10 extend upward to this overhead framework and are partially supported thereby in suitable manner. This bridge work also serves as suitable means for supporting the conveyer systems hereinafter described. One of these bridge superstructures would preferably be provided for each rotary cutter tower.

In order that a path may be prepared for the tractor which supports the lower I-beam of the first unit, an excavating screw of known form is shown, indicated as 21, Fig. 12, driven from gear 17$^b$ carried at the foot of the forwardly positioned shaft 17 by means of a train of gears indicated as 22.

It will be seen that some means must be provided to convey the earth away which falls down through the interior of the spiral rotary cutter, and also means to excavate below the rotary cutter so as to form a pathway for the tractor which supports the center base beam of the succeeding rotary cutter which, being at the same level as the tractor carried by the first unit, will be at a lower level than that to which the rotary cutter itself excavates. At this tractor supporting the second unit would normally be of greater dimension than the tractor supporting the first unit, the pathway excavated by the spiral screw would not be sufficiently wide. There are therefore provided elevator scoop systems, which not only elevate the earth as it falls inside the rotary cutter from off the spiral platform, but also excavates the earth from the bottom of the ditch.

The elevator conveyer system, scoop and otherwise, are shown in diagram in Fig. 6: 23 indicates a main longitudinal overhead conveyer on which the earth elevated by the elevator scoop systems discharges and by which it is conveyed to the rear to be suitably disposed of.

Each rotary unit is provided in the rear half thereof, with a laterally extending scoop elevator system indicated as 24, which passes over the main conveyer belt 23 and discharges therein. This chain of elevator scoops is driven as shown in Fig. 8 by means of a train of gears 25 driven from gear 17$^b$ carried by shaft 17. This chain of scoops passes under the lower drum and the central base I-beam and is adapted to scoop up the earth from the bottom of the ditch as the machine advances. Depending brackets 25$^a$ are shown which support the gearing adapted to operate this chain scoop system. At the top of the machine, the train passes over gears carried by shaft 26, which shaft is suitably carried by the bridge work. This system of scoop elevators operates entirely within one rotary cutting tower.

In addition there is provided a longitudinally extending system of scoop elevators, two systems for the first unit, one on each side, four in the second unit and in each succeeding unit, a pair on each side. In Fig. 1 in the first unit these are indicated as 27 and 27$^a$ carrying scoops 27$^d$.

These systems are driven, as shown in Fig. 7, off of a shaft 17 by means of a train of gears 28 in the same manner that the previously described system was driven. Each of these conveyer elevator scoop systems not only catches the falling earth as it rolls off the spiral platform down through the center of the rotary cutter, but also scoops up the earth from the bottom of the ditch.

The pair of systems 27 and 27$^a$ rises up through the first unit, extends to the rear passing over the gears 29 carried on shafts 29$^a$ which are supported in the bridge work in convenient manner, and down through the second rotary cutter, in the manner shown in Fig. 1$^b$. These systems of elevator scoops likewise dump into the main conveyer belt 23, but for this purpose inclined dumping chutes are provided as shown in Figs. 9, 10 and 11. The operation is shown most clearly in Fig. 11. These inclined chutes are indicated as 30 and are suitably supported from the framework. It will be seen in Figs. 10 and 11 that the scoop 27$^d$ carried by the chain of scoops 27 will commence to dump at approximately 45 degrees from the vertical and will complete this operation at or before the time it reaches the horizontal. The path of the falling earth is shown in Fig. 11. The path of the chain is then inwardly so that the scoop will clear the end of the chute. The earth discharges from the chute into the main conveyer belt 23, as shown. The earth is conveyed by the main conveyer belt to some suitable dump in the rear and discharged as desired.

The rotary cutting units succeeding the first unit will be seen to be provided with two parallel systems of longitudinally extending conveyers indicated as 27$^b$ and 27$^c$ in Fig. 1. The method of operation is identical with that just described.

To clear away the earth so as to provide a pathway for the stationary drum members, a reciprocating belt carrying cutter knives is provided adapted for operation around the circumference of these stationary drum members as shown in Fig. 20, which is a plan view of the lower drum member. The belt is indicated as 31, wound around spools 32 and 33 and provided with cutter knives 34, formed as shown to cut in either direction the belt reciprocates. The outer surface of the stationary drum is shown as provided with retaining flanges 31$^a$. Spools 32 and 33 are in reality vertical shafts extending all the way up to the framework overhead and around which each of the reciprocating belts is wound so as to reverse them all at one operation. Of course separate reversing mechanism could be provided for each unit if desired.

A reversible clutch mechanism is housed in casing 35, as shown in Fig. 23. 36 is a short shaft carrying a bevel gear 36$^a$ at the inner end adapted to mesh with a gear carried on a shaft 17. At the other end of the shaft 36 is a bevel gear 36$^b$ which meshes with gears 38$^a$ and 39$^a$ carried on sleeves 38 and 39 respectively, which sleeves are loosely mounted on shaft 37 at the opposite ends of which are fixed bevel gears 37ª and 37ᵇ. The middle portion of this shaft 37 is splined to receive a clutch collar 40 adapted to engage the inner ends of sleeves 38 and 39 so that when the clutch collar is thrown into engagement with either of the sleeves 38 or 39 the shaft 37 will be driven therethrough.

This reversing operation is effected by means of a forked member 41 which embraces said collar in a groove provided therefor. The opposite end of this forked member is provided with a roller 42 which rides in a groove in an elongated rotary member 43 which is mounted on shaft 43ª and driven by chain 44 from a gear on shaft 10. It will be seen that as this member 43 rotates it will reciprocate the collar 40 longitudinally on the shaft 37 bringing it into engagement with first one sleeve and then the other so as to drive first one spool and then the other, thus reciprocating the band 31 and the cutters 34 will cut a path for the stationary drum.

A modification is shown in Fig. 24 in which an endless chain 45 carrying cutting elements is mounted to rotate about the stationary drum 3. The web portion of the drum would have to be cut away to permit this chain to drive through and a multiplicity of these elements would have to be provided around the circumference of the drum. They could drive independently in any convenient manner.

It is apparent that spiral platforms 6, but one of which is shown per cutter in the drawings, may be provided in number desired. For example, three might be provided for the foremost cutting elements, and a greater number in the larger cutting elements. This would not only increase the strength of the cutter itself but would increase the cutting capacity.

It is furthermore apparent that instead of providing excavating units succeeding the foremost unit of greater diameters than such first unit, two units might be provided, one on each side of the median line and extending laterally equally beyond the zone excavated by the previous unit. These two units being of smaller diameter than the one large unit they supplant, would permit of lighter construction and be more adaptable in use.

I claim:

1. In a ditch digging machine, a series of vertical, cylindrical, rotary excavators positioned one in the rear of the other to form a train, separate successive excavators being of increasing diameters from front to rear of said train, means connecting the same together so they will move forward as one unit, means for propelling the same forward, means for rotating said excavators.

2. In an excavator, a series of rotary cutters positioned in the rear of one another to form a train, separate cutters being of successively increasing diameters from the front to the rear of said train, means for supporting said cutters so they will move forward as one unit, means for rotating said cutters.

3. In a ditch digging machine, a series of vertically disposed rotary cutter elements positioned one in rear of the other to form a train, separate cutter elements being of successively increasing diameters from front to rear of said train and separate cutter elements likewise supported at successively higher levels from front to rear of the train, means for supporting said cutter elements so that they may be moved forward as one unit, means for rotating said cutter elements.

4. In a ditch digging machine, a series of rotary cylindrical cutter elements positioned in the rear of one another to form a train supported at varying levels, increasing from front to rear of said train, each rotary cutter element comprising a cylindrical vertically positioned rotary cutter provided with a spiral platform carrying a series of outwardly projecting knives adapted to cut away the earth during the rotation of the cutter, means for rotating the cutter.

5. In a ditch digging machine, a series of cylindrical cutter elements mounted for rotation positioned one in the rear of the other to form a train, supporting means for said elements so they may advance as one unit, separate cutting elements being of varying diameters increasing from front to rear of said train, each separate cutter element comprising a spiral platform ledge provided with a series of outwardly projecting knives adapted to cut away the earth during the rotation of such cutter and so formed as to guide the earth cut away toward the interior of the spiral platform, means for rotating said cutters.

6. In a ditch digging machine, a base adapted for forward movement comprising a series of platforms stepped from higher to lower levels from rear to front, a series of cylindrical rotary cutters positioned one on each platform for rotation, said cutters being of varying diameters decreasing from higher to lower platforms, means for rotating said cutters, means for impelling the machine forwardly.

7. In a ditch digging machine, a series of cylindrical cutter elements positioned one in the rear of the other to form a train, supported so that they may move forward as one unit, separate cutter elements being of varying diameters increasing from front to rear and supported at varying levels increasing in height from front to rear, separate cutter elements comprising a spiral platform ledge supported between opposed end pieces, said spiral platform sloping toward the center of the cylindrical cutter element, a series of scoops carried by said platform projecting outwardly therefrom adapted to cut away the earth during the rotation of such cutter element.

8. In a ditch digging machine, a series of cylindrical vertically disposed cutter elements positioned in the rear of one another and supported at varying levels increasing in height from front to rear so that they may be moved forward as one unit in the form of a train, separate cutter elements being of varying diameters increasing from front to rear of the train, each cutter element comprising opposite end rings mounted so as to permit rotation of said cutter element about its vertical axis and a spiral platform ledge intervening said end rings, said platform ledge being provided with a series of projecting scoops adapted to cut away the earth during the rotation of such cutter element, means for rotating such rotary cutter element, an endless elevator comprising a series of scoops carried by an endless chain adapted to operate upwardly through said rotary cutter to carry up the earth falling down through the interior thereof.

9. In a ditch digging machine, a stepped platform base stepped from higher to lower levels from rear to front, supported for forward movement, a series of rotary spiral cutter elements positioned one on each of said platforms, said cutter elements being of varying diameters increasing from front to rear of said base, means for rotating each of said rotary cutter elements, each of said rotary cutter elements adapted for the superimposition of a similar rotary cutter element, a main conveyer comprising an endless belt extending from front to rear of said train positioned above said rotary cutter elements, endless chains carrying elevator scoops adapted to rise upwardly through each of said rotary cutter elements and adapted to dump into the main conveyer and to pass down through the rotary cutter element positioned immediately in the rear, the scoops of said elevator chain adapted to scrape up earth from the bottom of the ditch.

10. In a ditch digging machine, a series of rotary cutter elements positioned one in the rear of the other to form a train, separate cutter elements being of varying diameters increasing successively from front to rear of said train and supported at varying levels increasing successively in height from front to rear, a central tractor support under each of said cutter elements, each of said cutter elements comprising opposed end pieces carrying between them a spiral circumferential platform ledge provided with projecting scoops adapted to cut away the earth during the rotation of the cutter, main drive shafts positioned between separate cutter elements, means for driving each of said cutters from the drive shaft positioned in the rear thereof, an excavating element positioned forwardly of the tractor supporting the foremost rotary cutter element, an endless belt carrying elevator scoops adapted to operate upwardly one on each side through said rotary cutter elements and adapted to scrape the earth from the bottom of the ditch on each side of the tractor under the rotary cutter through which it operates to a level with said tractor, means for driving said endless belts.

11. In a device of the class described, a series of rotary cutter elements positioned one in the rear of the other to form a train of cutter elements of successively increasing diameters from front to rear and positioned at successively higher levels from front to rear of said train, tractor supports for each of such rotary cutters, such tractor supports connected together so that they will move forwardly as one unit, main drive shafts positioned between each of such rotary cutter elements, each of said cutter elements comprising externally and internally geared opposed end rings carrying an intervening circumferential spiral platform ledge provided with projecting upstanding cutter scoops adapted to cut away the earth during the rotation of the spiral cutter, a drive chain meshing with the external gear on each of said end rings adapted to be driven from the main drive shaft positioned in the rear thereof, vertical shafts positioned interiorly of said rotary cutters provided with gears meshing with the internally geared end rings so as to drive said shafts, such internally positioned shafts provided with gears adapted to drive a train of gears adapted to drive endless chain elevator and conveyer scoop systems, endless chains carrying elevator scoops adapted to operate upwardly through each of said rotary cutter elements to carry away the earth falling therethrough and adapted to scrape up earth from the bottom of the ditch, means positioned forwardly of the tractor support for the foremost cutter element to clear away the earth ahead of such tractor element.

12. In a ditch digging machine, a series of rotary cutter elements positioned one in the rear of the other to form a train of cutter elements of successively increasing diameters from front to rear of said train, tractor supports for each of said cutter elements, a stationary drum carried by said tractor support in which the rotary cutter is mounted for rotation, a second stationary drum properly supported positioned so that the opposite end of said cutter element operates therein, means for driving said rotary cutters, said upper drum adapted to receive a second similar rotary cutter element for superimposition over said first rotary cutter element, reciprocating cutter bands adapted to operate around the circumference of said stationary drums.

13. In a ditch digging machine, a series of rotary cutter elements positioned one in the rear of the other to form a train of cutter elements, such rotary cutters being of varying diameters inceasing from front to rear of such train and positioned at a higher level from front to rear, tractor supports for each of such rotary cutters, endless chains of elevator scoops operating upwardly through said rotary cutters to carry away the earth falling therethrough, such elevator scoops connected in chain extending downwardly below the bottom of the cutter elements so as to scrape up earth from the bottom of the ditch on each side of the tractor support for said rotary cutter, a rotary screw cutter positioned forwardly of the first tractor element to clear away the earth forwardly thereof.

14. In a ditch digging machine, a platform base properly supported upon a tractor element for movement, a stationary drum carried thereby, a rotary cylindrical cutter element positioned within said stationary drum for rotation, said rotary cutter comprising end rings externally and internally geared and a spiral platform intervening the same provided with outwardly projecting cutter scoops adapted to cut away the earth during the rotation of the cutter, driven chains adapted to mesh with the external gearing of said end rings driving said cutter elements, vertically disposed shafts positioned internally of said cutter elements adapted to mesh with the internally geared circumference of the end rings so as to be driven thereby, a train of gears carried at the lower extremity of said internally positioned shafts provided with supporting brackets extending from the platform base said train of gears adapted to be driven from the vertically disposed shafts and adapted in turn to drive the supporting tractor elements which support the platform base.

15. In a ditch digging machine, a stepped platform base stepped from higher to lower levels from rear to front provided with proper tractor supporting elements, a stationary drum carried on each stepped platform, a vertically disposed cylindrical rotary cutter comprising externally and internally geared end rings carrying intervening spiral platform provided with outwardly projecting scoops disposed within said drum for rotation, vertical drive shafts positioned between separate successive rotary cutters, drive chains driven thereby meshing with the external gearing on the end rings of the rotary cutters so as to drive the same, vertical shafts positioned internally of the rotary cutters adapted to mesh with the internal gearing of the end rings so as to be driven thereby, endless chains of elevator scoops adapted to operate upwardly through said rotary cutter elements to carry up the earth falling therethrough, means carried by said vertical shafts positioned internally of the rotary cutters adapted to drive a train of gears to operate said endless chains, one of said endless chains of elevator scoops adapted to operate on each side of the tractor support for the rotary cutter to scrape away the earth below the rotary cutter element and alongside the tractor, an overhead conveyer belt into which the elevator scoops are adapted to dump.

16. In a ditch digging machine, a plurality of earth cutting units operatively connected to progressively advance in unison, said units each being movable on a vertical axis and relatively located to remove the earth in successive increments located beyond the lateral bounds of the zone removed in the previous increment, whereby the progressive advance of the apparatus will produce an excavation of a width corresponding to the distance between the lateral bounds of the last removed increments.

17. In a ditch digging machine, a plurality of earth cutting instrumentalities of increased diameter operatively connected to progressively advance in unison, said instrumentalities each being movable on a vertical axis and relatively located to remove the earth in a succession of increments located beyond the lateral bounds of the zone removed in the previous increment, whereby the progressive advance of the apparatus will produce an excavation of a width corresponding to the distance between the lateral bounds of the last removed increments.

18. In excavating apparatus, a plurality of earth cutting instrumentalities operatively connected to progressively advance in unison, each of said instrumentalities including a plurality of cutting elements located in a spiral succession with the axis of the spiral corresponding to the axis of the instrumentality, said instrumentalities each being movable on a vertical axis and relatively located to remove the earth in a succession of increments with successive increments located beyond the lateral bounds of the zone removed in the previous increment, whereby the progressive advance of the apparatus will produce an excavation of a width corresponding to the distance between the lateral bounds of the last removed increments.

19. In excavating apparatus, a plurality of earth-cutting instrumentalities operatively connected to progressively advance in unison, said instrumentalities each being movable on a vertical axis and relatively located to remove the material in a succession of increments, uniformly spaced laterally from a median line of the completed excavation and with successive increments located beyond the lateral bounds of the zone removed in the previous increment, whereby the progressive advance of the apparatus will produce an excavation of a width corresponding to the distance between the lateral bounds of the last removed increments.

In testimony whereof I sign this specification.

THEOPHIL J. FREDA.